(12) United States Patent
Kerin, Jr.

(10) Patent No.: US 9,989,178 B2
(45) Date of Patent: Jun. 5, 2018

(54) QUICK CONNECT COUPLING

(71) Applicant: Martinrea Industries, Inc., Troy, MI (US)

(72) Inventor: James J. Kerin, Jr., Grosse Pointe Woods, MI (US)

(73) Assignee: Martinrea Industries, Inc., Troy, MI (US)

( * ) Notice: Subject to any disclaimer, the term of this patent is extended or adjusted under 35 U.S.C. 154(b) by 91 days.

(21) Appl. No.: 15/146,993

(22) Filed: May 5, 2016

(65) Prior Publication Data

US 2016/0327197 A1 Nov. 10, 2016

Related U.S. Application Data

(60) Provisional application No. 62/157,753, filed on May 6, 2015.

(51) Int. Cl.
*F16L 37/098* (2006.01)

(52) U.S. Cl.
CPC ....... *F16L 37/0987* (2013.01); *F16L 2201/10* (2013.01)

(58) Field of Classification Search
CPC .............. F16L 37/0987; F16L 2201/10; F16L 37/0985
USPC .......................................... 285/93, 315, 319
See application file for complete search history.

(56) References Cited

U.S. PATENT DOCUMENTS

| | | | | |
|---|---|---|---|---|
| 4,753,458 A | * | 6/1988 | Case ................... | F16L 37/0987 285/93 |
| 4,793,637 A | * | 12/1988 | Laipply ............... | F16L 37/0987 285/93 |
| 4,834,423 A | * | 5/1989 | DeLand .............. | F16L 37/0987 285/319 |
| 4,913,467 A | * | 4/1990 | Washizu ............. | F16L 37/0985 285/319 |
| 5,069,424 A | * | 12/1991 | Dennany, Jr. ....... | F16L 37/0987 285/319 |
| 5,069,489 A | * | 12/1991 | Bartholomew ..... | F16L 37/0987 285/319 |
| 5,100,182 A | * | 3/1992 | Norkey ............... | F16L 37/0982 285/319 |
| 5,161,834 A | * | 11/1992 | Norkey ............... | F16L 37/0987 285/319 |
| 5,219,188 A | * | 6/1993 | Abe .................... | F16L 37/0982 285/319 |
| 5,226,680 A | * | 7/1993 | Bahner ................ | F16L 37/101 285/93 |
| 5,342,099 A | * | 8/1994 | Bahner ................ | F16L 37/133 285/319 |
| 5,441,313 A | * | 8/1995 | Kalahasthy ......... | F16L 37/0982 285/319 |
| 5,662,359 A | * | 9/1997 | Kargula .............. | F16L 37/0987 285/319 |
| 5,725,257 A | * | 3/1998 | Sakane ................ | F16L 37/088 285/319 |

(Continued)

*Primary Examiner* — David E Bochna
(74) *Attorney, Agent, or Firm* — Dinsmore & Shohl LLP

(57) ABSTRACT

A quick connect coupling having a housing with a through-bore to receive a tube. A verifier is mounted to the housing which nests in the housing when the coupling is fluidly connected. Otherwise, the verifier protrudes outwardly from the housing to provide an indication that the coupling is not fully connected.

4 Claims, 3 Drawing Sheets

(56) References Cited

U.S. PATENT DOCUMENTS

| | | | |
|---|---|---|---|
| 5,779,278 A * | 7/1998 | Grooters | F16L 37/0987 |
| | | | 285/319 |
| 5,806,898 A * | 9/1998 | Hollnagle | F16L 37/098 |
| | | | 285/319 |
| 5,915,738 A | 6/1999 | Guest | |
| 5,931,509 A * | 8/1999 | Bartholomew | F16L 37/0987 |
| | | | 285/319 |
| 6,068,303 A * | 5/2000 | Hollnagle | F16L 37/098 |
| | | | 285/319 |
| 6,343,814 B1 * | 2/2002 | Bucher | F16L 37/0982 |
| | | | 285/319 |
| 6,536,807 B1 * | 3/2003 | Raymond | F16L 37/0985 |
| | | | 285/319 |
| 6,883,779 B2 * | 4/2005 | Borgmeier | F16L 37/0987 |
| | | | 285/319 |
| 7,316,428 B2 * | 1/2008 | Takayanagi | F16L 37/0987 |
| | | | 285/319 |
| 7,341,282 B2 * | 3/2008 | Moretti | F16L 37/0985 |
| | | | 285/93 |
| 9,599,267 B2 * | 3/2017 | Dude | F16L 37/0985 |
| 2003/0098583 A1 | 5/2003 | Clinche | |

\* cited by examiner

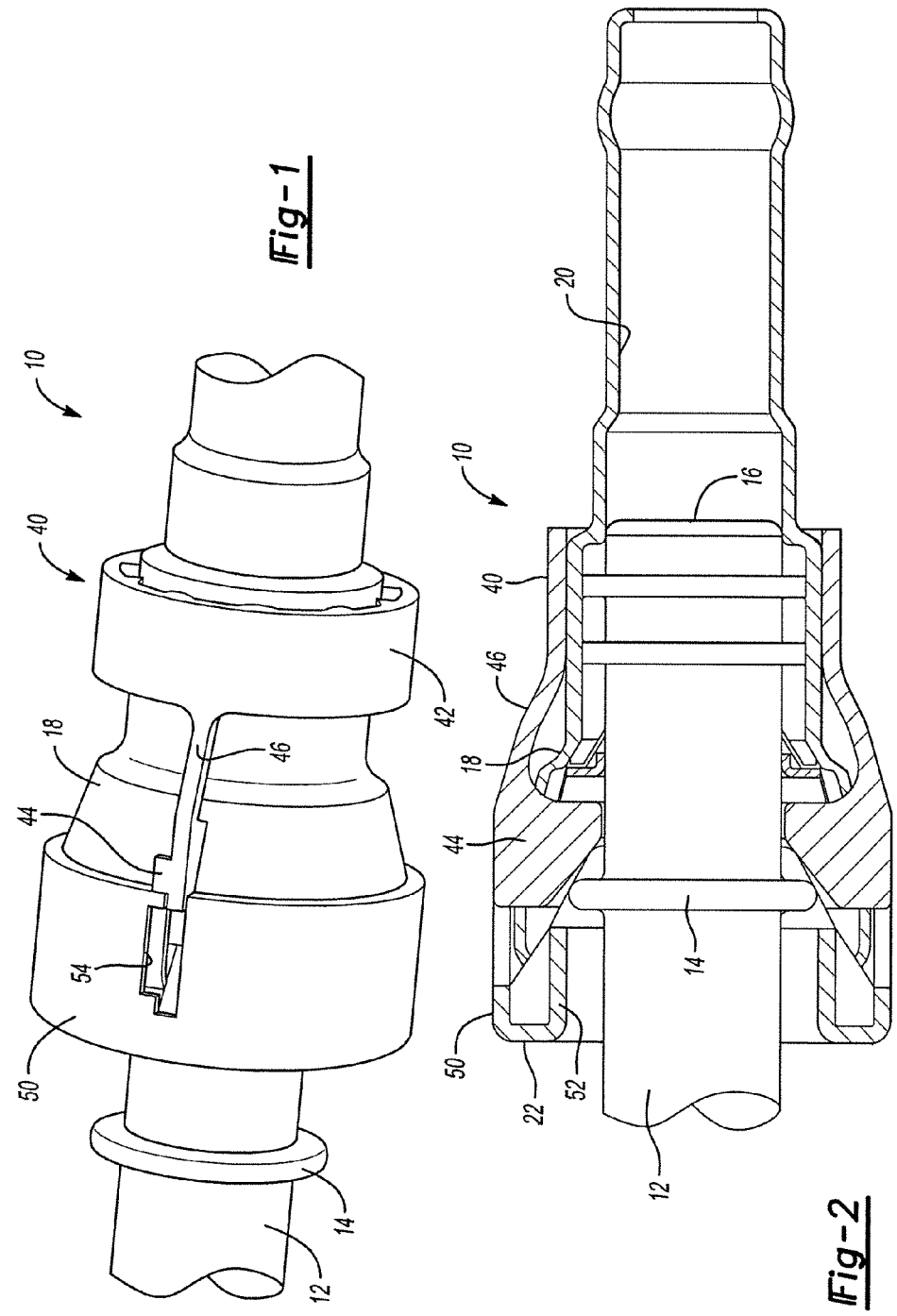

QUICK CONNECT COUPLING

CROSS-REFERENCE TO RELATED APPLICATIONS

This application claims priority of U.S. Provisional Application No. 62/157,753 filed May 6, 2015, the contents of which are incorporated herein by reference.

BACKGROUND OF THE INVENTION

I. Field of the Invention

The present invention relates to quick connect couplings.

II. Description of Related Art

Quick connect couplings are widely used in a variety of fluid connections, especially in the automotive industry. Such quick connect couplings typically comprise a housing having an axial through passageway. The housing is designed to receive a tube having an expanded bead at one end so that, upon insertion of the tube into the housing, the tube is fluidly sealed to the housing. In order to lock the tube in its connected position, a retainer, typically constructed of spring steel, is contained within the housing and frictionally engages the side of the tubing bead facing outwardly from the housing. Consequently, upon insertion of the tube into the housing, the bead flexes the retainer fingers radially outwardly to allow the bead to pass beyond the retainer fingers. Once the bead is fully positioned within the housing and the fluid coupling is in a fully connected position, the retainer fingers flex inwardly and engage the outwardly facing side of the bead thus locking the bead, and thus the tube, to the housing. Appropriate fluid seals are contained within the housing to provide a fluid seal between the tube and the housing.

In many, if not most, situations, it is imperative that the tube be fully inserted into the connector housing so that the retainer fingers properly engage the tube on its outwardly facing side. However, if the tube is only partially connected to the fluid connector, the fluid connector and tube can separate after extended use. Since such fluid couplings are oftentimes used in fuel systems, an improperly, or only partially, connected fluid connector and tube can result in disastrous consequences.

SUMMARY OF THE PRESENT INVENTION

The present invention provides a quick connect coupling which overcomes the above mentioned disadvantages of the previously known fluid couplings.

In brief, the fluid coupling of the present invention includes a housing having a throughbore. The housing is dimensioned to receive one end of a beaded tube inserted into the housing. Furthermore, as in the previously known quick connect couplings, a retainer having a plurality of retaining fingers is mounted within the housing which engage the outwardly facing side of the tube bead when the tube is fully inserted into the connector housing.

A release sleeve is also slidably mounted to the housing so that the release sleeve surrounds the tube and also so that the release sleeve extends partially outwardly from the open end of the housing. This release sleeve is dimensioned so that, upon compression of the release sleeve into the housing, the release sleeve engages the resilient fingers of the retainer and flexes these resilient fingers outwardly. By flexing the retainer fingers outwardly, the tube and fluid coupling can be connected when desired.

Unlike the previously known quick connect couplings, however, the present invention further includes a verifier assembly having a verifier barrel which is axially slidably mounted around the connector housing. The verifier assembly includes two or more circumferentially spaced verifier tabs. Each verifier tab includes a flexible verifier arm which connects a verifier tab to the barrel.

Each verifier is aligned with a slot formed in the release sleeve. Furthermore, the verifier tabs are dimensioned so that the verifier tabs can extend around the outwardly extending side of the tube bead only when the tube is fully connected to the fluid connector. Otherwise, the verifier tabs flex radially outwardly from the release sleeve and provide an indication that the tube is not fully connected to the fluid connector. However, when the tube is fully fluidly connected to the connector, the verifier tabs flex radially inwardly and nest within their slots in the release sleeve and provide the desired indication that the fluid connector and tube are fully connected together.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating the fluid connector in an unconnected condition with a tube;

FIG. 2 is a longitudinal sectional view illustrating the fluid connector in an unconnected position;

DETAILED DESCRIPTION OF THE INVENTION

Figure 3:
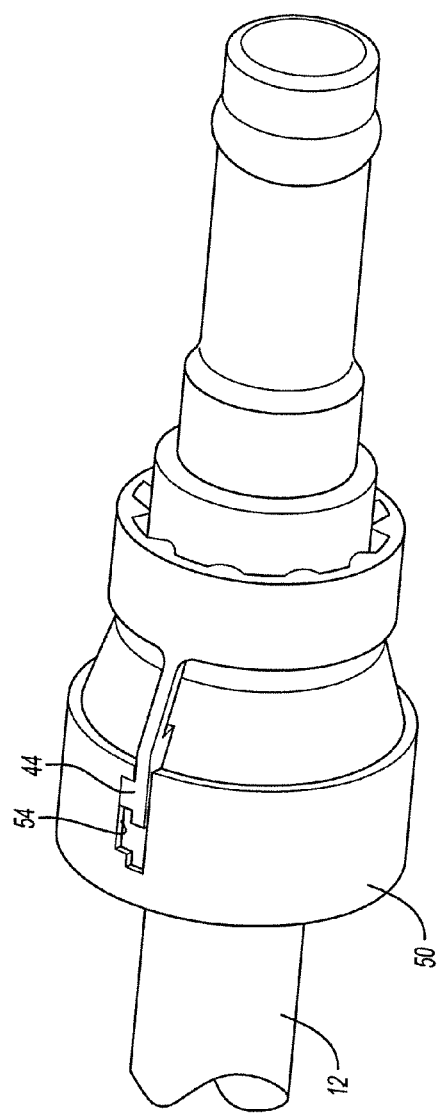
FIG. 3 is a view similar to FIG. 1, but illustrating the connector in a fully connected position.

With reference first to FIGS. 1 and 2, a quick connect coupling 10 is shown for use with a tube 12 having an annular and outwardly protruding bead 14 adjacent its free end 16. The quick connect coupling 10 includes a housing 18 having an axially extending throughbore 20. In addition, the housing 18 is expanded radially outwardly at its open end 22 to axially receive the tube 12.

Figure 4:
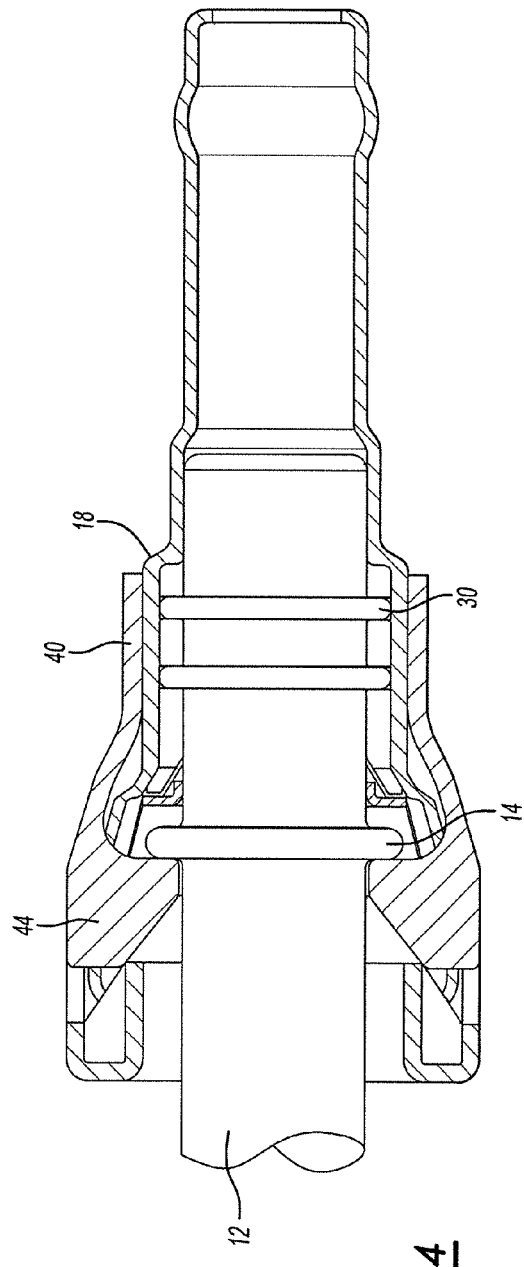
FIG. 4 is a view similar to FIG. 2, but illustrating the connector in a fully connected position.
Figure 5:
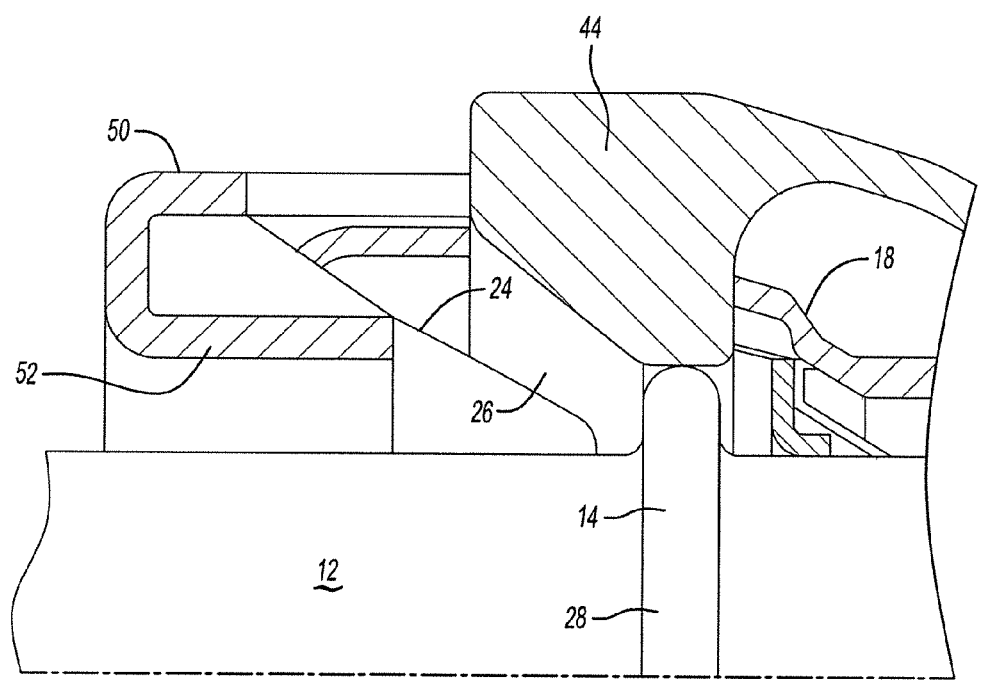
FIG. 5 is a longitudinal partial sectional view illustrating the connection of the fluid connector to the tube and the operation of the indicator tabs.

With reference now to FIGS. 1-4, the tube 12 is axially slidably mounted between an unconnected position, illustrated in FIGS. 1 and 2, and a fully connected position, illustrated in FIGS. 3-5.

With reference now particularly to FIG. 5, a resilient retainer 26 having a resilient finger 24 is contained within the housing 18. During the insertion of the tube 12 into the housing 18 from the position shown in FIGS. 1 and 2 and to the position shown in FIGS. 3-5, the bead 14 will deflect the resilient retainer fingers 24 radially outwardly and allow the bead 14 to pass by the retainer fingers 24. However, as best shown in FIG. 5, when the tube 12 is fully inserted into its connected position into the housing 18, the retainer fingers 24 spring radially inwardly and engage the outwardly facing side 28 of the bead 14 thus locking the tube 12 to the housing 18. Furthermore, in this position, a seal 30 (FIG. 4) in the housing 18 fluidly sealingly engages the outer periphery of the tube 12 and completing the fluid seal. Conversely, however, unless the tube 12 is inserted to its fully connected position shown in FIG. 5, the tube 12 may be easily retracted from the housing 18.

With reference now to FIGS. 1, 2, and 5, a verifier 40 preferably made of plastic includes a barrel 42 that is axially slidably mounted to the housing 18. At least two verifier tabs 44 are connected to the barrel 42 by spring arms 46. These spring arms 46 thus allow the verifier tabs 44 to flex radially outwardly, as shown in FIG. 5, when the tube bead 14 passes under the verifier tabs 44.

As best shown in FIGS. 2 and 3, a release sleeve 50 is axially slidably mounted to the housing 18. This release sleeve 50 includes an inner annular wall 52 which registers with the resilient fingers 24 of the retainer 26 (FIG. 5). Thus, assuming that the tube 12 is in its fully connected position as shown in FIG. 5, movement of the release sleeve 50 toward the housing 18 causes the wall 52 to engage the resilient fingers 24 and flex the resilient fingers 24 radially outwardly. This, in turn, disconnects the resilient fingers 24 of the retainer 26 from the tube 12 and allows the tube 12 to be retracted from the housing 18 when desired.

As best shown in FIGS. 1 and 3, each verifier tab 44 with its attached verifier arm 46 registers with a slot 54 formed in the release sleeve 50. In a fashion that will be subsequently described, when the tube 12 is fully connected to the housing 18, the verifier tab 44 fully nests within the release sleeve 50. Conversely, if the tube 12 is not fully connected with the housing 18, the verifier tab 44 is positioned outside of the slot 54 or, alternatively, protrudes radially outwardly from the release sleeve 50.

In practice, in order to connect the tube 12 to the housing, the tube is moved from its unconnected position, illustrated in FIGS. 1 and 2, and to its connected position, shown in FIGS. 3 and 4. As the tube moves to its connected position, the bead 14 flexes the verifier tab radially outwardly from the release sleeve 50 as best shown in FIG. 5.

The verifier barrel 40 is then slid towards the release sleeve 50. Assuming that the tube 12 is fully connected to the housing 18, the verifier tabs 44 flex radially inwardly as shown in FIG. 4 so that the verifier tabs 44 are positioned within the slots 54 on the release sleeve 50 and behind the bead 14. However, if the tube 12 is not fully connected to the housing 18, it will not be possible to move the verifier tabs 44 into their slots 54 on the release sleeve 50 thus providing a visual indication that the fluid connector is not fully connected.

Having described the invention, many modifications thereto will become apparent to those skilled in the art to which it pertains without deviation from the spirit of the invention as defined by the appended claims.

I claim:

1. A quick connect fluid coupling comprising:
    a housing having a throughbore,
    a tube having an outwardly extending bead adjacent one end, said one end of said tube being insertable into said housing throughbore between a connected position and an unconnected position,
    at least one resilient finger mounted in said housing, said at least one resilient finger engaging an outwardly facing end of said bead when said tube is in said connected position,
    a release sleeve slidably mounted to said housing and movable between a locked position and a release position in which said sleeve deflects said at least one resilient finger radially outwardly to a position in which said at least one finger releases said tube from said housing, said release sleeve having an axially extending through slot,
    a verifier axially slidably mounted to said housing, a portion of said verifier being positioned in said through slot of said release sleeve, said verifier being radially movable relative to said tube from an outer position in which said verifier protrudes radially outwardly from said release sleeve and to an inner position in which said verifier is nested within said sleeve only when said at least one resilient finger engages an outwardly facing end of said bead.

2. The invention as defined in claim 1 wherein said at least one resilient finger comprises two resilient fingers.

3. The invention as defined in claim 2 wherein said at least two resilient fingers are diametrically opposed.

4. The invention as defined in claim 1 wherein said verifier is constructed of plastic.

\* \* \* \* \*